Figure 1:
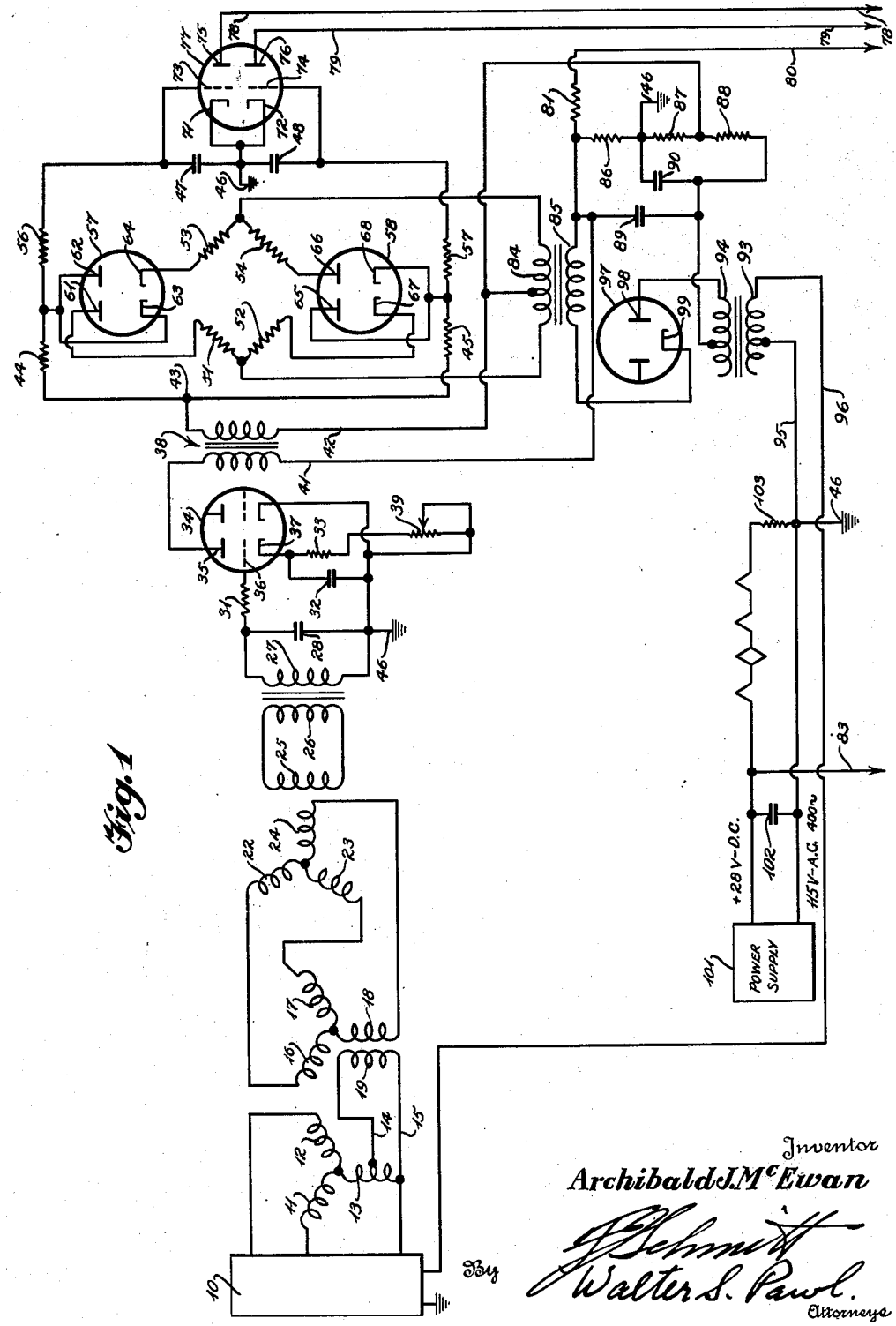

Dec. 15, 1953        A. J. McEWAN        2,663,008
GYROSTABILIZED CARRIER AIRCRAFT APPROACH LIGHT INDICATOR
Filed June 8, 1950        2 Sheets-Sheet 2
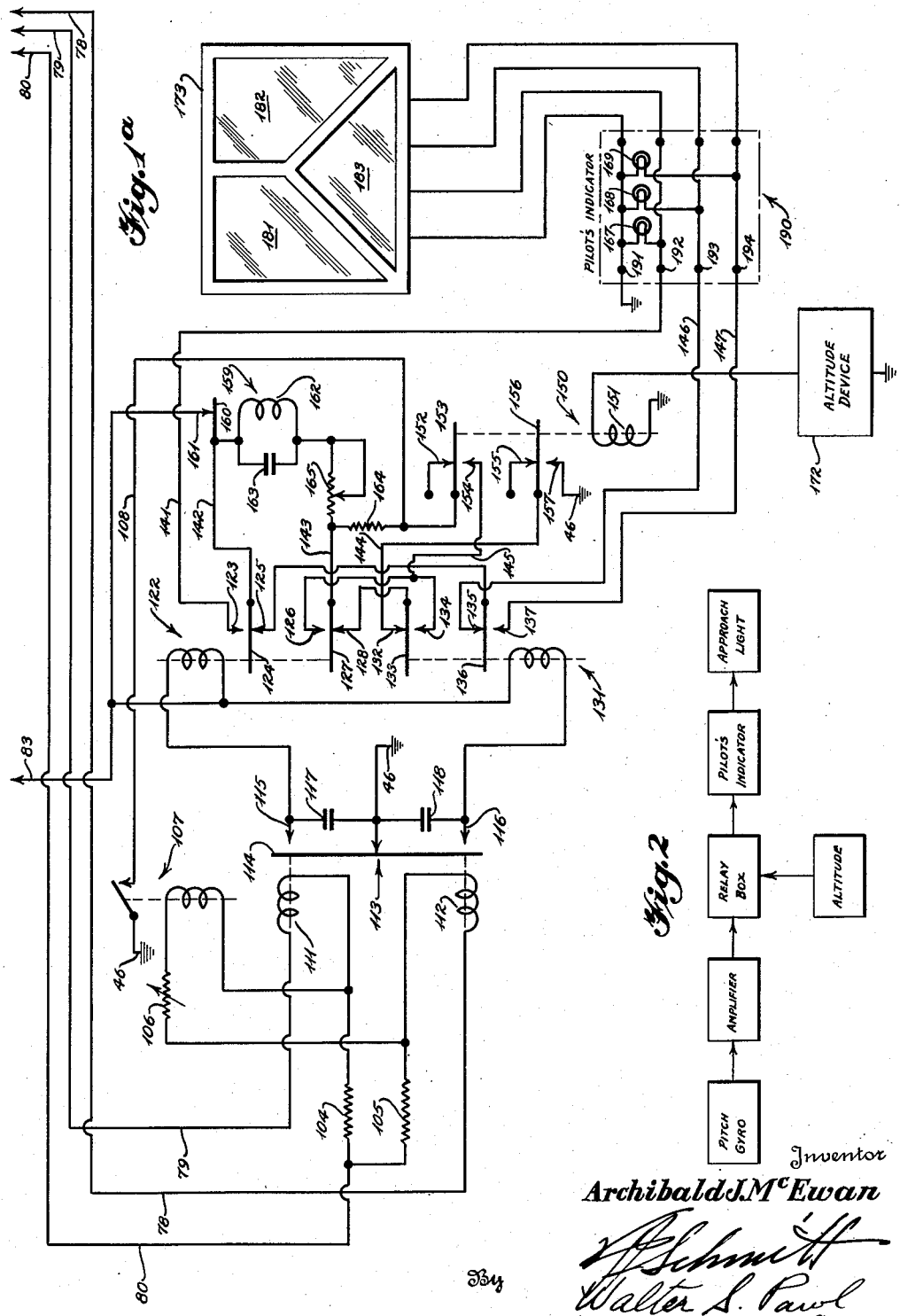
Inventor
Archibald J. McEwan
By
Walter S. Paul
Attorneys Patented Dec. 15, 1953

2,663,008

UNITED STATES PATENT OFFICE 2,663,008

GYROSTABILIZED CARRIER AIRCRAFT APPROACH LIGHT INDICATOR

Archibald John McEwan, United States Navy

Application June 8, 1950, Serial No. 166,951

8 Claims. (Cl. 340—27)

(Granted under Title 35, U. S. Code (1952), sec. 266)

This invention relates to signaling apparatus for use on aircraft and more particularly to landing apparatus for indicating to the pilot and to a landing control operator stationed at the landing point a plurality of aircraft flight conditions including the attitude and altitude of the aircraft.

Prior art devices have been characterized by a number of disadvantages. For example, one prior art device utilizes a tri-colored lens approach light indicator consisting of a lamp with three separate lenses, red, amber, and green, usually secured in the leading edge of the port wing of the aircraft. As viewed from the landing signal officer's platform aboad a carrier the color seen indicates the attitude of the aircraft with reference to a correct attitude for approach. This apparatus, however, has the disadvantage that the color seen depends upon the angle of view.

The apparatus embodying the instant invention comprises a gyro-stabilized element with electrical take-offs along the pitch axis, a zero centering selsyn, a signal rectification amplifier, a relay system, a pilot's indicator, and an approach light indicator, employing three lamps of different colors, for example, green, amber, and red. While the aircraft is in the correct approach attitude the amber lamp burns; a nose-up attitude excites the green lamp, and a nose-down attitude excites the red lamp. When the nose-up and nose-down attitudes approach an extreme condition the respective lamps begin to blink. Whenever, while the aircraft is in the correct attitude, the altitude falls below a predetermined safe minimum, the amber lamp blinks or occults at a fast rate; whenever the nose-up or nose-down is excessive and is accompanied by a too low altitude, the red or green lamps occult at a fast rate.

Accordingly, it is an object of the invention to provide new and improved aircraft signaling apparatus.

Another object is to provide new and improved lamp apparatus for indicating the attitude and altitude of an aircraft.

Another object is to provide new and improved signaling apparatus for indicating the instant attitude of an aircraft with respect to a reference attitude.

Other objects and advantages will become apparent after a consideration of the following specification taken in connection with the accompanying drawings in which:

Figs. 1 and 1A taken together comprise a schematic electrical circuit diagram of apparatus embodying the invention; and Fig. 2 is a block diagram illustrating the operation of the circuit of Figs. 1 and 1A.

Referring now to the drawings and in particular to Figs. 1 and 1A thereof, there is shown at 10 a power supply of, for example, 400 cycles, 3 phase alternating current. This supply 10 provides a suitable voltage of, for example, 26 volts for energizing the three windings 11, 12, and 13 of a gyroscope motor. The winding 13 is tapped as shown, and connected by way of leads 14 and 15 to coil 19 which is coupled to winding 18 of a pitch autosyn device having additional windings 16 and 17. The three windings 16, 17, and 18 of the pitch autosyn are connected as shown to windings 22, 23, and 24 respectively of a zero set autosyn, the output of which is taken from winding or coil 25 and applied to the primary 26 of a transformer having secondary 27. The zero set is provided by adjusting the relative positions of coils 22, 23, and 24 with respect to coil 25, any suitable means not shown, being provided for this purpose. One terminal of secondary 27 is connected by way of resistor 31 to grid 36 of an electron discharge tube generally designated by the reference numeral 34. Secondary 27 has capacitor 28 in shunt therewith. The other terminal of secondary 27 is connected to ground 46 and by way of capacitor 32 to cathode 37; capacitor 32 has connected in shunt therewith the series connected resistor 33 and potentiometer 39. The anode 35 of tube 34, which may be one known in the trade as a type 6SN7, is connected to one terminal of the primary of a transformer generally designated 38; the other primary terminal is connected by way of lead 41 to one terminal of capacitor 89, for reasons to be subsequently apparent.

One terminal of the secondary of transformer 38 is connected through junction 43 to resistor 44, which is connected to the cathode 63 of one section and the anode 62 of the other section of a dual diode tube 57, which may be of the type known in the trade as a 6H6. The other anode 61 is connected by way of resistors 51 and 52 to the cathode 67 of one section of a second dual diode tube 58. The anode 65 of this last named section is connected to the cathode 68 of the second section of tube 58, and both anode 65 and cathode 68 are connected by way of resistor 45 to aforementioned junction 43. The anode 66 of the second section of tube 58 is connected by way of resistors 54 and 53 to the cathode 64 of the second section of tube 57. The junction between resistors 53 and 54 is connected to one end of transformer secondary 84, while the other end of secondary 84 is connected to the junction between resistors 51 and 52. The center tap of secondary 84 is connected by way of lead 42 to the other end of the secondary of transformer 38. Tubes 57 and 58 preferably have substantially identical characteristics, and resistors 51, 52, 53, and 54 preferably have equal values of resistance.

The aforementioned anode 62 and cathode 63 are connected by way of resistor 56 and capacitor 47 to the ground 46; aforementioned anode 65 and cathode 68 are connected by way of resistor 57 and capacitor 48 to ground 46.

A dual triode tube generally designated 77 has one control grid 74 thereof connected to the junction between capacitor 48 and resistor 57; the other control grid 73 is connected to the junction between resistor 56 and capacitor 47. The cathodes 71 and 72 of the tube are connected together and to ground 46. Anode 75 is connected by way of lead 78 to the relay apparatus of Fig. 1A, presently to be described, while anode 76 is connected by way of lead 79 to the aforementioned relay apparatus.

A diode tube generally designated 97, which may be of the type known in the trade as a 6X5, has the cathode 99 thereof connected to one terminal of transformer primary 85 associated with aforementioned secondary 84; the other terminal of primary 85 is connected to aforementioned lead 41, to capacitor 89, to one end of resistor 86, and by way of resistor 81 and lead 80 to the relay apparatus of Fig. 1A.

Anode 98 of tube 97 is connected to one end of secondary 94 having primary 93 associated therewith. Primary 93 is energized by way of lead 96 from one phase of the aforementioned three phase supply 10 by a suitable voltage of, for example, 115 v., A. C.

Lead 95 is grounded as shown at 46. Power supply 101 supplies 28 v., D. C. to ground, which is conducted by lead 83 to the relay apparatus of Fig. 1A. Capacitor 102 is connected from lead 83 to ground. The filaments or heaters of the various electron discharge tubes are connected in series with each other and with resistor 103 across the aforementioned 28 v., D. C. source.

The other terminal of the aforementioned secondary 94 is connected to the other terminal of capacitor 89, and by way of series connected resistors 83 and 87 to ground 46. Capacitor 90 is connected in shunt with resistors 87 and 88. The junction between resistors 87 and 88 is connected to aforementioned lead 42. Aforementioned resistor 86 has one terminal thereof connected to ground, and connected to the junction between resistor 81 and primary 85.

Particular reference is made now to Fig. 1A, in which the circuit of the aforementioned relay apparatus is shown. Six relays are employed, including normally open circuit relay generally designated 107; a differential relay generally designated 113; two relays generally designated 122 and 131 each having two armatures, 124 and 127, and 133 and 136 respectively; blinker relay 159 having armature 160, and relay 150 having armatures 153 and 156.

Aforementioned lead 79 is connected through winding 111 of differential relay 113, through resistors 104 and 105, and thence through winding 112 of relay 113 to aforementioned lead 78. Aforementioned lead 80 is connected to the junction between resistors 104 and 105, which preferably have equal values. The junction between winding 111 and resistor 104 is connected to one terminal of the winding of relay 107; the junction between resistor 105 and winding 112 is connected by way of variable resistor 106 to the other terminal of the winding of relay 107.

Differential relay 113 has the armature 114 thereof connected to ground 46, as shown; contact 115 is connected by way of capacitor 117 to ground and is further connected to one end of the winding of relay 122, the other end of this winding being connected to aforementioned lead 83.

Contact 116 of relay 113 is connected to ground 46 by way of capacitor 118, and is further connected to one terminal of the winding of relay 131, the other terminal of this last named winding being connected to lead 83.

Armature 124 of relay 122 is connected by way of lead 142 to armature 160 of relay 159; contact 123 is connected by way of lead 141 to terminal 192 of a pilot's indicator generally designated 190; contact 125 is connected to armature 136 of relay 131; contact 126 is connected to contact 134 of relay 131 and also by way of lead 145 to contact 154 of relay 150; armature 127 is connected by way of lead 143 and resistor 164 to lead 108; contact 128 is connected to armature 133 of relay 131.

In the aforementioned relay 131, contact 132 is connected by way of lead 144 to armature 156 of relay 150; armature 133 is connected as aforementioned; contact 134 is connected as aforementioned; contact 135 is connected by way of lead 146 to terminal 193 of pilot's indicator 190; armature 136 is connected as aforementioned, and contact 137 is connected by way of lead 147 to terminal 194 of aforementioned indicator 190.

The aforementioned lead 108 is connected to the contact of aforementioned relay 107, and the armature of relay 107 is connected to ground 46.

The aforementioned relay 159 has capacitor 163 and coil or winding 162 connected in shunt with each other. One end terminal of this shunt circuit is connected to aforementioned armature 160 and lead 142; the other terminal of capacitor 163 and coil winding 162 is connected by way of variable resistor 165 to lead 143 and armature 127.

The winding 151 of relay 150 is energized by a signal from altitude device 172, in a manner to be subsequently described; contact 152 is not connected; armature 153 is connected to aforementioned lead 108; contact 154 is connected as aforementioned; contact 155 is not connected; armature 156 is connected as aforementioned; and contact 157 is connected to ground 46.

The aforementioned pilot's indicator 190 may conveniently be mounted within the pilot's view, and contains the three lamps, 167, 168, and 169, which may be red, amber, and green respectively, lamp 167 being energized when a sufficient difference of potential exists between terminals 191 and 192; lamp 168 being energized when a sufficient difference of potential exists between terminals 191 and 193, and lamp 169 being energized when a difference of potential exists between terminals 191 and 194.

The wing lamp indicator generally designated 173 may also contain three lamps 181, 182, and 183 of the same three colors as those of indicator 190, energized in the same manner.

The operation of the aforedescribed apparatus is substantially as follows: The output of the pitch gyro is fed into the zero set autosyn. These may be of any convenient design, it being understood that the electrical take off is along the pitch axis, and that means, not shown, is provided for adjusting the pitch angle which it is desired to use for reference. The output of the zero set autosyn is transformer coupled to the grid of the triode 34 of the voltage amplifier. The output of this amplifier is transformer coupled by means of the interstage transformer 38 to the signal rectification circuit. This signal rectification circuit consists of the secondary 84 of the power transformer and the secondary of the interstage transformer 38, with the two double diodes 57 and 58 and the dual triode tube 77, which may be of the type known as a 6SN7.

Prior to entering the rectification circuit, which includes a rectifier bridge as shown, the 400 cycle pitch secondary voltage is properly phased with a 400 cycle locally generated voltage from the tube 97, used as a halfwave rectifier, and the transformer including primary 85 and secondary 84. This combination of voltages then passes to two arms of the rectifier bridge. The rectifier bridge, composed of the two twin half wave rectifier tubes 57 and 58, converts the 400 cycle voltage to D. C. Each of the grids 73 and 74 in the tube 77 is energized by this D.-C. voltage and controls the flow of plate current to the micro-positioner or polarized differential relay 113. The micropositioner or relay 113 selectively actuates relay 122 and relay 131, which in turn result in the energization of the proper bulbs in the approach light indicator 173 and pilot's indicator 199. Whenever the differential voltage across the two resistors 104 and 105 and the plate circuit of the tube 77 attains a predetermined value, relay 107 closes and places the blinker circuit (consisting of winding 162 of relay 159, the capacitor 163, which may have a value of 50 m. f. d., the resistor 164, which may have a value of 820 ohms, and the potentiometer 165), in operation. The operation of this relay 159 periodically interrupts the 24 volt supply to the various approach lights, depending upon the instant positions of the contacts of the other relays.

Whenever the aircraft, while in the correct approach attitude as determined by the setting of the zero set autosyn, drops below a predetermined altitude, as set, for example, by a suitable control, not shown, on the altitude device 172, which may be of conventional design, for example, an altimeter adapted to generate a D.-C. signal when the altitude of the aircraft falls below a predetermined value, the relay 159 is energized. This relay, when energized, alters the aforedescribed blinker circuit through armature 156, contact 132 of relay 131, armature 133, contact 128 of relay 122, and armature 127. The result of this operation not only causes the amber light 168 (the normal approach light) to blink if it is illuminated, but since the 820 ohm resistor 164 in the blinker circuit is shunted, the blinker rate is much faster. This fast blink rate is indicative to the pilot and flight control officer of flight below the preset minimum altitude.

Assuming correct altitude, whenever the aircraft attitude varies slightly above or below the normal attitude, the red lamp 167 or green lamp 169 will selectively be energized depending upon the direction of deviation of the aircraft pitch from the preset desired attitude or pitch angle. The blinking of lights 167 or 169 does not occur for slight pitch deviation because in the circuit as now comprised, the armature 133 of relay 131 and armature 127 of relay 122 are wired in series. Thus, any small unbalance of currents at the differential relay 113, when the attitude is other than normal, opens the circuit either through armature 133 of relay 131 or armature 127 of relay 122, and deenergizes or opens the blinker circuit. When, however, the aircraft exceeds a maximum pitch deviation for safe flight, relay 107 closes, and if relay 150 is closed, due to flight below the minimum preset altitude, the following operations take place: relay 107, when closed, grounds or completes the blinker circuit at the low side of the resistor 164; this normally would result in the low blink rate similar to that which occurs above minimum preset altitude. However, since the circuit is closed through armature 153 of relay 159, the resistor 164 is shunted by way of armature 153 of relay 159 and either armature 127 of relay 122 or armature 133 of relay 131, depending on the direction of attitude variance. The result is a fast blink rate on the red or green attitude indicators when below the preset safe minimum altitude.

Accordingly, it is seen that apparatus is provided in which, for normal landing in which the aircraft has the proper attitude and altitude, the amber light 168 is illuminated. If the altitude remains as desired, but the plane noses up, the amber light will go out and green light 169 will come on; if the plane noses down from its normal attitude, the amber light goes out and the red light 167 comes on. If the deviations become excessive, these lights begin to blink at a slow rate.

If the altitude falls below the safe value, the amber lamp will blink at a fast rate even when the attitude is correct; if the attitude becomes such that the nose up or nose down is excessive, lamp 167 or 169 will flicker at a fast rate if the altitude falls too low.

Obviously many modifications and variations of the present invention are possible in the light of the above teachings. It is therefore to be understood that within the scope of the appended claims the invention may be practiced otherwise than as specifically described.

This invention may be manufactured and used by or for the Government of the United States of America for governmental purposes without the payment of any royalties thereon or therefor.

What is claimed as new and desired to be secured by Letters Patent of the United States is:

1. In apparatus of the character disclosed for use on aircraft for indicating to an operator a plurality of aircraft flight conditions including the attitude of the aircraft, in combination, manually adjustable means including a gyroscope supplying an A.-C. signal having an amplitude proportional to the amount of deviation of the aircraft pitch from a predetermined pitch angle, phase sensitive means having said A.-C. signal applied thereto and constructed and arranged to supply two D.-C. signals which vary in amplitude with respect to each other selectively in accordance with the direction of deviation from said predetermined pitch angle, differential relay means having two pairs of contacts adapted to be selectively closed in accordance with the direction of the flow of current through the relay, said differential relay means having said two D.-C. signals applied thereto, three lamps, a source of potential, and circuit means including additional relay means connecting the contacts of said differential relay means and said source of potential to all said lamps whereby a first one of said lamps is energized while there is substantially no deviation from said predetermined pitch angle, a second one of said lamps is energized while the pitch angle varies in one direction, and the third one of said lamps is energized while the pitch angle varies in the other direction.

2. In apparatus of the character disclosed for use on aircraft for indicating to an operator the attitude of the aircraft, in combination, manually adjustable means including a gyroscope for obtaining an A.-C. signal having an amplitude proportional to the amount of deviation of the aircraft pitch angle from a predetermined angle, phase sensitive means having said A.-C. signal applied thereto and constructed and arranged to supply two D.-C. signals which vary in amplitude with respect to each other selectively in accordance with the direction of deviation from said predetermined pitch angle, differential relay means having two pairs of contacts adapted to be selectively closed in accordance with the direction of the flow of current through the relay means, said differential relay means having said two D.-C. signals applied thereto, three lamps, a source of potential, additional relay means having one set of contacts and having said two signals applied thereto and adapted to be energized to close the contacts thereof when the difference in the signal amplitudes attains at least a predetermined value, blinker circuit relay means having contacts and having the energization thereof controlled from the contacts of said additional relay means, and circuit means connecting the contacts of both said polarized and blinker relay means and said source of potential to all said lamps whereby a first one of said lamps is energized while there is substantially no deviation from said predetermined pitch angle, a second one of said lamps is energized while the pitch angle varies in one direction, and the third one of said lamps is energized while the pitch angle varies in the other direction, said blinker circuit relay means when energized causing said lamps to blink at a predetermined rate.

3. In apparatus of the character disclosed for use on aircraft for indicating a plurality of aircraft flight conditions, in combination, a source of alternating current of predetermined frequency, manually adjustable means including a gyroscope energized from said source for obtaining an A.-C. signal having an amplitude proportional to the amount of deviation of the aircraft pitch from a predetermined pitch angle, phase sensitive means including an electron discharge tube bridge operatively connected to said source, having said A.-C. signal applied thereto, and constructed and arranged to supply two D.-C. signals which vary in amplitude with respect to each other selectively in accordance with the direction of deviation from said predetermined pitch angle, differential relay means having said two D.-C. signals applied thereto and having two pairs of contacts adapted to be selectively closed in accordance with the direction of the flow of current through the relay means, a source of potential, first and second relays connected to said source and to said differential relay means and energized while said two pairs of contacts are closed respectively, first, second, and third lamps, circuit means including blinker means interconnecting all said lamps, the contacts of said first and second relays and said source of potential, said circuit means and blinker means being so constructed and arranged that said lamps are energized alternately, said first lamp being constantly energized while there is substantially no deviation in said pitch angle, said second lamp being constantly energized while there is deviation in one direction, and said third lamp is constantly energized while there is deviation in the other direction, said second and third lamps blinking at a slow rate while the deviation exceeds a predetermined value.

4. Apparatus according to claim 3 including in addition, an altitude device adapted to generate an altitude signal while the altitude of the aircraft is below a predetermined value, and a third relay energized by said altitude signal, said third relay having the contacts thereof interconnected in said circuit means, said circuit means being additionally characterized as including means for causing said first lamp to blink at a fast rate while said altitude signal is being generated, and there is substantially no deviation, and said second and third lamps to blink at a fast rate while said altitude signal is being generated and said deviation exceeds said predetermined value.

5. In apparatus of the character disclosed for indicating the attitude of an aircraft, in combination, a source of alternating current of predetermined frequency, gyroscope means energized from said source and adapted to provide an A.-C. pitch signal of said frequency proportional in amplitude to the instant deviation of the aircraft from a predetermined pitch attitude, phase sensitive rectifier means having applied thereto said pitch signal and an additional A.-C. reference signal of the same frequency obtained from said source, said rectifier means being adapted to provide a pair of D.-C. output signals which vary in amplitude with respect to each other selectively in accordance with the direction of pitch deviation and in amounts proportional to the amount of pitch deviation, differential relay means having both said D.-C. output signals applied thereto, a pair of indicator lamps, and circuit means including a source of potential connecting said pair of lamps to said differential relay means for selectively energizing said lamps in accordance with the direction of deviation, and additional means including a relay for causing said lights to blink when the D.-C. signals attain predetermined amplitudes.

6. In apparatus of the character disclosed for indicating the attitude of an aircraft, in combination, gyroscope means for generating a pitch signal, adjustable zero-set autosyn means energized by said signal for providing an output signal proportional in amplitude to the pitch deviation of the aircraft from a predetermined pitch angle, means operatively connected to said autosyn means for amplifying said output signal, phase sensitive means having said amplified output signal applied thereto for generating a pair of D.-C. signals which vary in amplitude with respect to each other selectively in accordance with the direction of pitch deviation, differential relay means having said pair of D.-C. signals applied thereto and having contacts, a pair of lamps, a source of potential, and circuit means interconnecting said pair of lamps with the contacts of said differential relay means and said source of potential, whereby the lamps of said pair are selectively energized in accordance with which one of said pair of D.-C. signals exceeds the other in amplitude, and blinker means connected in said circuit means, and additional relay means energized from said pair of D.-C. signals for controlling the operation of said blinker means to cause the lamps to blink when the amount of said deviation attains at least a predetermined value.

7. In apparatus of the character disclosed for indicating the attitude of an aircraft, in combination, gyroscope means for generating a pitch signal, adjustable zero-set autosyn means energized by said signal for providing an output signal proportional in amplitude to the pitch deviaation of the aircraft from a predetermined pitch angle, means operatively connected to said autosyn means for amplifying said output signal, phase sensitive means having said amplified output signal applied thereto for generating a pair of D.-C. signals which vary in amplitude with respect to each other selectively in accordance with the direction of pitch deviation, differential relay means having said pair of D.-C. signals applied thereto and having contacts, a pair of lamps, a source of potential, and circuit means interconnecting said pair of lamps with the contacts of said differential relay means and said source of potential, whereby the lamps of said pair are selectively energized in accordance with which one of said pair of D.-C. signals exceeds the other in amplitude, and blinker means connected in said circuit means, altitude signal generating means for generating a signal when the altitude of the aircraft falls below a predetermined value, and aditional relay means energized from said altitude signal and connected to said blinker means for controlling the operation of said blinker means to thereby cause said lamps to blink when the altitude falls below said predetermined value.

8. In apparatus of the character disclosed for indicating the altitude of an aircraft, in combination, gyroscope means for generating a pitch signal, adjustable zero-set autosyn means energized by said signal for providing an output signal proportional in amplitude to the pitch deviation of the aircraft from a predetermined pitch angle, means operatively connected to said autosyn means for amplifying said output signal, phase sensitive means having said amplified output signal applied thereto for generating a pair of D.-C. signals which vary in amplitude with respect to each other selectively in accordance with the direction of pitch deviation, differential relay means having said pair of D.-C. signals applied thereto and having contacts, a pair of lamps, a source of potential, and circuit means interconnecting said pair of lamps with the contacts of said differential relay means and said source of potential, whereby the lamps of said pair are selectively energized in accordance with which one of said pair of D.-C. signals exceeds the other in amplitude, and blinker means connected in said circuit means, altitude signal generating means for generating a signal when the altitude falls below a predetermined value, first additional relay means energized from said altitude signal, second additional relay means energized by either one of said pair of D.-C. signals when said one of said pair of D.-C. signals attains at least a predetermined amplitude with respect to the other, both said first and second additional relay means being connected to said blinker means to control the same to thereby cause said lamps to blink while the deviation from said predetermined pitch angle exceeds a predetermined value and while the altitude is below a predetermined value.

ARCHIBALD JOHN McEWAN.

References Cited in the file of this patent

UNITED STATES PATENTS

| Number | Name | Date |
|---|---|---|
| 843,746 | Hall | Feb. 12, 1907 |
| 1,514,753 | Wold | Nov. 11, 1924 |
| 2,114,283 | Anderson | Apr. 19, 1938 |
| 2,405,231 | Newhouse | Aug. 6, 1946 |
| 2,410,821 | Hillman | Nov. 12, 1946 |
| 2,430,205 | Barry | Nov. 4, 1947 |
| 2,484,022 | Esval | Oct. 11, 1949 |
| 2,554,760 | Wallace | May 29, 1951 |